(12) United States Patent
Meijer et al.

(10) Patent No.: US 7,409,636 B2
(45) Date of Patent: Aug. 5, 2008

(54) LIGHTWEIGHT APPLICATION PROGRAM INTERFACE (API) FOR EXTENSIBLE MARKUP LANGUAGE (XML)

(75) Inventors: Henricus Johannes Maria Meijer, Mercer Island, WA (US); Anders Hejlsberg, Seattle, WA (US); David L. Remy, Mercer Island, WA (US); Arpan A. Desai, Bothell, WA (US); Asad Jawahar, Woodinville, WA (US); Andrew E. Kimball, Sammamish, WA (US); Donald F. Box, Yarrowpoint, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 11/193,567

(22) Filed: Jul. 29, 2005

(65) Prior Publication Data

US 2007/0028163 A1 Feb. 1, 2007

(51) Int. Cl.
*G06F 17/00* (2006.01)
(52) U.S. Cl. ..................................................... 715/255
(58) Field of Classification Search ................ 715/500, 715/513, 200, 234, 255
See application file for complete search history.

(56) References Cited

U.S. PATENT DOCUMENTS

| | | | | |
|---|---|---|---|---|
| 6,635,089 | B1 * | 10/2003 | Burkett et al. | 715/513 |
| 6,690,981 | B1 * | 2/2004 | Kawachi et al. | 700/83 |
| 6,993,529 | B1 * | 1/2006 | Basko et al. | 707/100 |
| 7,114,147 | B2 * | 9/2006 | Ballantyne et al. | 717/107 |
| 7,117,216 | B2 * | 10/2006 | Chakraborty et al. | 707/100 |
| 2004/0015783 | A1 * | 1/2004 | Lennon et al. | 715/523 |
| 2004/0060007 | A1 * | 3/2004 | Gottlob et al. | 715/513 |
| 2004/0098384 | A1 * | 5/2004 | Min et al. | 707/3 |
| 2004/0210828 | A1 * | 10/2004 | Langer | 715/501.1 |
| 2004/0243921 | A1 * | 12/2004 | Carr et al. | 715/500 |
| 2004/0260691 | A1 * | 12/2004 | Desai et al. | 707/4 |
| 2005/0027681 | A1 * | 2/2005 | Bernstein et al. | 707/1 |
| 2005/0055336 | A1 * | 3/2005 | Hui et al. | 707/3 |
| 2005/0138073 | A1 * | 6/2005 | Zhou et al. | 707/104.1 |
| 2006/0031763 | A1 * | 2/2006 | Yeung | 715/523 |

(Continued)

OTHER PUBLICATIONS

Vieria et al., Xverter : Querying XML Data with OR-DBMS, ACM 2003, pp. 37-44.*

(Continued)

*Primary Examiner*—Cong-Lac Huynh
(74) *Attorney, Agent, or Firm*—Amin, Turocy & Calvin, LLP

(57) ABSTRACT

An architecture that leverages support for markup language operations, e.g., extensible markup language (XML) queries, via a lightweight application program interface (API). The API defines an object model that can simplify construction of XML values in languages that do not natively support XML. The novel aspects of the described innovation can enable query languages to be factored into general operations (e.g., mapping, filtering, sorting, and/or projection of functions) on collections on one hand, and a set of domain specific operations (e.g., navigation, construction and modification) on the elements of these collections on another hand. The subject API can support creation of XML data that is node centric (e.g., context-free). Accordingly, nodes do not have to be constructed within the context of a document. Additionally, aspects can enable expression-oriented interface mechanisms as opposed to the imperative statement-oriented style interfaces used in connection with traditional interface mechanisms (e.g., DOM).

16 Claims, 11 Drawing Sheets

U.S. PATENT DOCUMENTS

2006/0179068 A1\* 8/2006 Warner et al. ............... 707/100
2007/0067716 A1\* 3/2007 Jung et al. .................. 715/513

OTHER PUBLICATIONS

Boifati et al., Pushing Reactive Services to XML Repositories Using Active Rules, ACM 2001, pp. 633-641.\*

Sundaresan et al., Algorithms and Programming Models for Efficient Representation of XML for Internet Applications, ACM 2001, pp. 366-375.\*

Wong, The Extended XQL for Querying and Updating Large XML Databases, ACM Nov. 2001, pp. 95-104.\*

Bonifati, et al. "Pushing Reactive Services to XML Repositories using Active Rules", ACM 2001, 9 pages.

Vieira, et al. "XVerter: Querying XML Data with OR-DBMS", ACM 2003, 8 pages.

Sundaresan, et al. "Algorithms and Programming Models for Efficient Representation of XML for Internet Applications", ACM 2001, 10 pages.

International Search Report dated Jul. 16, 2007 for PCT Application Serial No. PCT/US06/25577, 4 Pages.

\* cited by examiner

LIGHTWEIGHT APPLICATION PROGRAM INTERFACE (API) FOR EXTENSIBLE MARKUP LANGUAGE (XML)

BACKGROUND

Markup languages and applications associated therewith continue to evolve and become commonplace in today's computing environments. Generally, a markup language describes a set of labels that are embedded within text to distinguish groups of elements or individual elements for display or identification purposes. Typically, the labels are known as "tags." Markup languages identify elements within a continuous stream of text rather than more structured data in a database. One particular markup language, extensible markup language (XML), can convert text streams into the equivalent of database records.

Today, XML is known as an open standard for describing data. Oftentimes, XML is employed to define data elements with respect to a web page and/or business-to-business documents. XML is similar in tag structure to Hypertext Markup Language (HTML). However, HTML defines how elements are to be displayed while XML defines the logical content of the elements.

As such, contrary to HTML which uses predefined tags, XML enables a developer of a page to define tags. Thus, virtually any data item can be identified using XML. As a result, XML documents of fragments can function similar to database records. To this end, database functionality can be employed upon XML fragments.

By way of example, a business can use XML to define items such as product, customer and outstanding balance due. Accordingly, by using XML to identify these items, XML documents of fragments can be structured and function much like database records. This common method for identifying data (e.g., XML) supports business-to-business transactions and has become a commonplace format for electronic data interchange (EDI) transactions.

XML tags are defined in an XML schema, which identifies content type as well as the name of elements and attributes. Unlike HTML, which is known to employ a somewhat loose coding style tolerant of coding errors, convention XML pages have to be "well formed."

Because XML organizes records in a format similar to a database format, recent developments have been directed to querying upon and navigating through XML fragments. To this end, many special purpose languages have been created to effect obtaining information. However, these special purpose languages require imperative mechanisms to operate upon the traditional rigid programmed fragments.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system and methodology that leverages support for extensible markup language (XML) queries via a lightweight application program interface (API). These leveraged techniques enable the query of data models in addition to the XML structures described herein. In another aspect, the leveraged techniques can also simplify construction of XML values in languages that do not natively support XML.

Aspects of the described innovation can enable query languages to be factored into general operations on collections on one hand, and a set of domain specific operations on the elements of these collections on another hand. Examples of general query operations that are particularly useful on any collection are mapping (e.g., projection) functions over collections, filtering elements from collections, grouping collections into partitions, sorting collections, and aggregating operations over collections to reduce them to values. Examples of domain specific operations (e.g., actions) in the XML domain include the various "axis" functions such as selecting children, attributes, descendants, siblings, etc., element construction to create new XML nodes and node modification.

With respect to the XML domain specific operations, conventional APIs for navigating and constructing XML as used by general purpose languages are very imperative, highly complex and irregular when compared to the regularity of the XPath axis and the expression-oriented element and attribute construction as offered by XML centric languages. Additionally, traditional APIs (e.g., DOM (document object model)) are also rather heavyweight in terms of memory footprint.

In accordance therewith, aspects of the invention disclose a lightweight and rational API that facilitates manipulation (e.g., constructing, querying, modifying) of markup language content (e.g., XML) and can interface with general query infrastructure(s) provided by an underlying application and/or host language. More particularly, an aspect of the subject API can support creation of XML that is node centric (e.g., context-free) as opposed to document centric. In other words, nodes do not have to be constructed within the context of a root document. As well, aspects can enable expression-oriented interface mechanisms as opposed to the imperative statement-oriented style interfaces used in conjunction with traditional interface mechanisms (e.g., DOM).

In another aspect of the subject invention, both elements and attributes are accessed in a similar fashion. In other words, in one aspect the same axis can be employed to access an element as can be used to access an attribute with an XML document and/or fragment. Moreover, other aspects employ mechanisms that do not have specific identify for text nodes and collections of attributes.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
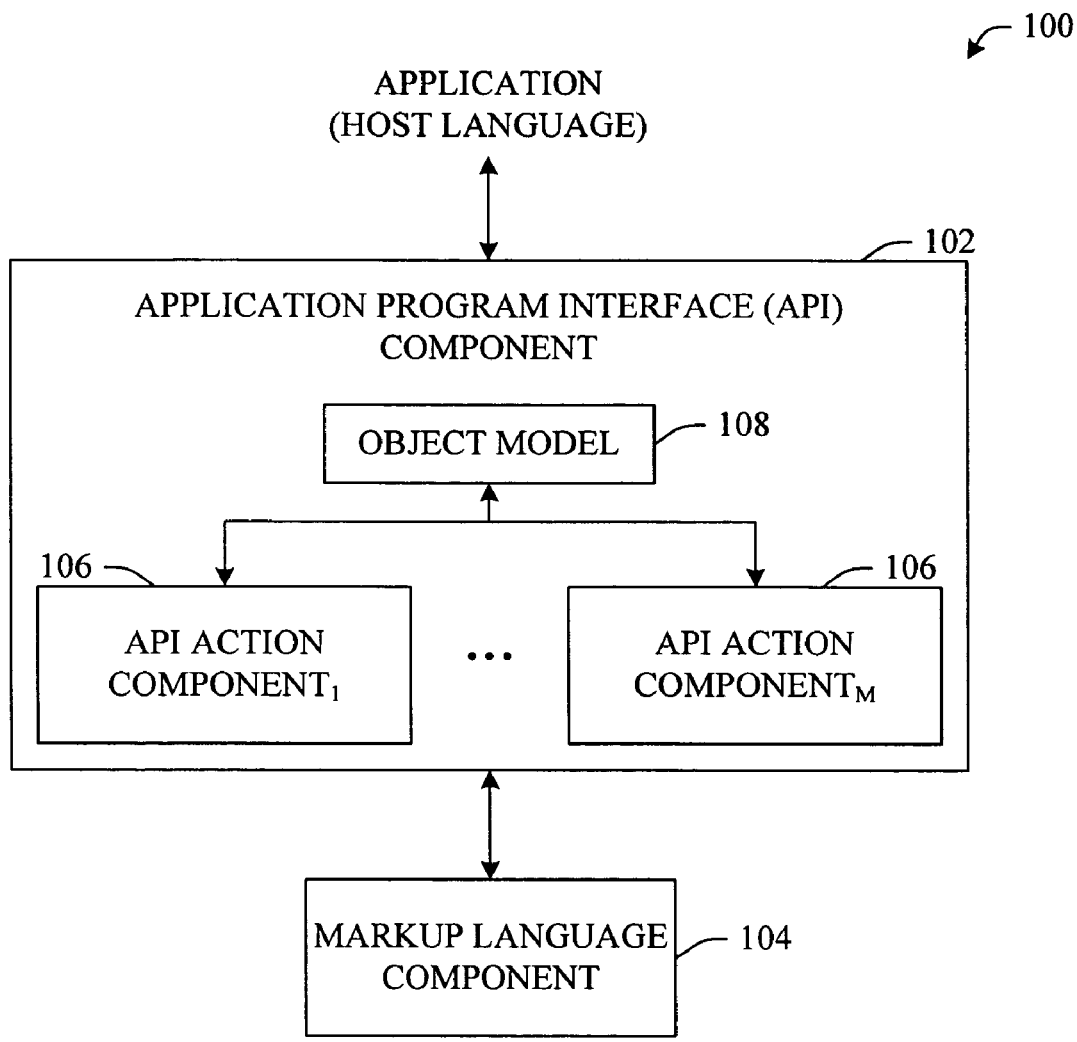
FIG. 1 illustrates a system that facilitates an object model that interfaces between an application and a markup language component in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

By careful factoring of the fundamental principles that underlie emerging programming languages that have been changing the landscape of markup language (e.g., extensible markup language (XML)) programming, the subject invention leverages support for markup language data (e.g., XML) queries via a lightweight API. These leveraged techniques enable the query of data models in addition to the XML structures described herein. The leveraged techniques can also simplify construction of XML values in languages that do not natively support XML. Although the aspects described herein are directed to an XML implementation, it is to be understood and appreciated that the novel concepts and functionality disclosed herein can be applied in other markup language environments. As such, these additional implementations are to be considered a part of this disclosure and claims appended hereto.

Aspects of the described innovation can enable query languages, including XQuery and SQL, to be factored into general operations on collections on the one hand, and a set of domain specific operations on the elements of these collections on the other hand. Examples of general query operations that are particularly useful on any collection are mapping (e.g., projection) functions over collections, filtering elements from collections, grouping collections into partitions, sorting collections, and aggregating operations over collections to reduce them to values. Examples of domain specific operations (e.g., actions) in the XML domain include the various "axis" functions such as selecting children, attributes, descendants, siblings, etc., element construction to create new XML nodes and node modification.

Database researchers have long discovered that these generic operations on collections are all instances of the concepts of functors, monoids, or monads. Accordingly, these operations satisfy many algebraic properties and allow syntactic benefit in the form of comprehensions. By way of example, FLOWR expressions in XQuery-brand environments are a form of comprehensions and are not in any way tied to operating over collections of XML nodes. On the contrary, FLOWR expressions could be useful to express complex queries over collections of objects or relational tables of rows as well.

Rather than creating specialized languages for querying XML, general purpose languages can be extended with query capabilities based on monads, allowing programmers to query any form of data, using a broad notion of "collection". The mechanisms (e.g., API) described in this document enable the patterns and language constructs that support these query mechanisms.

With respect to the XML domain specific operations, conventional APIs for navigating and constructing XML as used by general purpose languages are very imperative, highly complex and irregular when compared to the regularity of the XPath axis and the expression-oriented element and attribute construction as offered by XML centric languages. Additionally, traditional APIs (e.g., DOM (document object model) are also rather heavyweight.

In accordance therewith, aspects of the invention disclose a lightweight, rational, and simple API for manipulating (e.g., constructing, querying, modifying) XML that can interface with a general query infrastructure(s) provided by an underlying application and/or host language. In particular, the subject invention can support creation of XML that is node centric (e.g., context-free) as opposed to document centric. As well, aspects can enable expression-oriented interface mechanisms as opposed to the imperative statement-oriented style of traditional interface mechanisms (e.g., DOM).

Referring initially to FIG. 1, a system 100 that facilitates interaction between an application, e.g., host language, and a markup language is shown. Generally, the system 100 can include an application program interface (API) 102 that enables the application to interface and communicate with a markup language component 104. By way of example, the API 102 can facilitate the application, such as a query component, to navigate within the markup language collection (e.g., markup language component 104) thereby identifying desired nodes therein. As will be appreciated, APIs can be implemented by writing function calls in an application (e.g., query component), which provide the linkage to the required subroutine for execution. Thus, an API can imply that some program module or API action component 106 is available in the computer to perform the operation or that it is linked into the existing program to perform the tasks.

In the example above, the API 102 can employ 1 to M API action components, where M is an integer. As shown, 1 to M API action components can be referred to collectively or individually as API action components 106. Moreover, although FIG. 1 illustrates API action components 106 integral to the API 102, it is to be understood and appreciated that all or a subset of API action components 106 can be located remotely from the components illustrated.

Further, API 102 can include an object model 108. The object model 108 can define node types specific to the markup language component 104. In other words, object model 108 can facilitate a mapping from the application (host language) to the markup language component 104. As described supra with reference to API action components 106, the object model 108 can be located local or remote from the API component 102.

The structure of the API object model 108 can include the following node type and/or public classes. Although a specific naming convention is described infra, it is to be appreciated that any naming convention can be employed without departing from the novel functionality of the invention described herein and the scope of the claims appended hereto. Each of the node types of the exemplary object model are described in greater detail infra.

class XName

This class, XName, represents universal names composed of a namespace uniform resource identifier (URI) and a local name. Because, in accordance with the invention, elements and attributes are treated in the same manner, this class can be employed to represent the names of both elements and attributes. The system can implicitly convert from strings to these names. As such, a user does not explicitly construct the XName. Rather, a user can reference string names and the API 102, to convert the string to the XName.

class XAttribute

This class, XAttribute, can be employed to represent attributes. For example, the XAttribute class can be employed to obtain the value of the attribute in a typed manner. It is to be appreciated that attributes are distinct from XML nodes.

abstract class XNode

This class can be utilized as an abstract base class for the various XML node types.

class XComment : XNode

This class can inherit from nodes that represent comments in a document. In other words, if a comment exists in a document, the comment can be represented by an XComment node. For example, this class can inherit from a node that represents an XML comment such as <!--this is a comment-->.

class XProcessingInstruction : XNode

In an example, this node can be used to represent XML processing instructions such as <? ?>.

class XDeclaration : XNode

The above node can represent an XML declaration such as <?xml version="1.0" encoding="UTF-8" ?>.

class XDocumentType : XNode

This node can be employed to represent an XML document type declaration such as <!DOCTYPE greeting SYSTEM "hello.dtd">.

abstract class XCharacterNode : XNode class XCData : XCharacterNode

This is an exemplary node that represents XML CData section <![CDATA[this is a CDATA section]]> abstract class XContainer : XNode

This is an abstract base class for nodes that have children.

class XElement : XContainer

This is a node that has an abstract base class XContainer which derives from XNode. As stated above, it is to be understood that XContainer represents all of the nodes that have children. For example, comments, processing instructions, etc. only have one child or content. On the other hand, the XElement and XDocument classes can have lower children which support this abstract base class called XContainer in this example. In one example, this node can represent XML elements such as <Customer Name="Joe"> ... </Customer>.

class XDocument : XContainer

In conclusion of the discussion of the exemplary object model, this node, XDocument, can represent a complete XML document.

Figure 2:
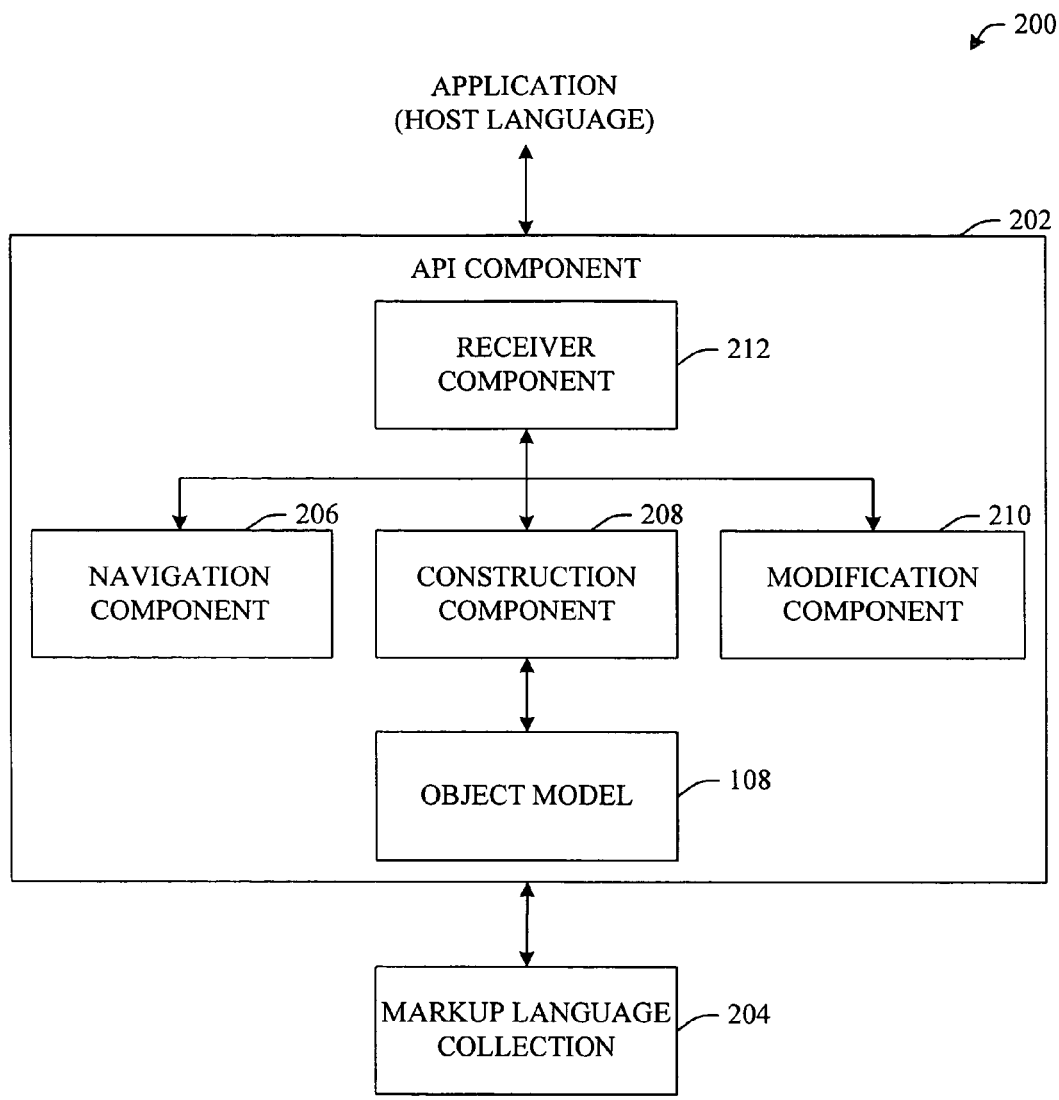
FIG. 2 illustrates a block diagram of an application program interface (API) having a navigation component, a construction component and a modification component in accordance with an aspect of the API.

Referring now to FIG. 2, a block diagram of an alternative system 200 in accordance with an aspect is shown. Generally, the system 200 includes an API component 202 and a markup language collection 204. The API component 202 can include an object model 108, a navigation component 206, a construction component 208, a modification component 210 and a receiver component 212. Each of these action components (206, 208, 210) can employ the object model 108 to facilitate operations with respect to the markup language collection 204. Each of these components (206, 208, 210) will be discussed in greater detail with respect to the figures that follow.

Figure 3:
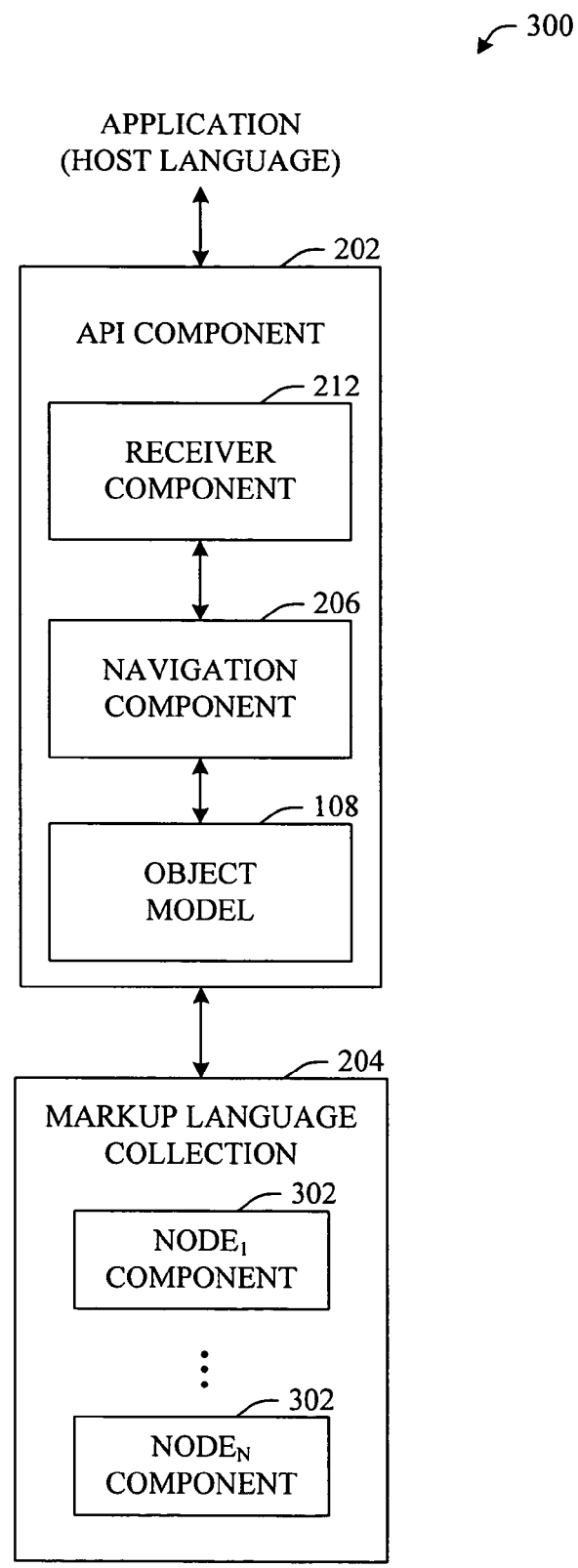
FIG. 3 illustrates a block diagram of an API system having a navigation component and a receiver component in accordance with an aspect of the invention.

Turning now to FIG. 3, in one aspect, a system 300 can include an API 202 that enables general query operators that navigate (e.g., via navigation component 206) and retrieve resultant data from a markup language collection 204 (e.g., XML fragments and/or collections of nodes). As shown, markup language collection 204 can include 1 to N node components, where N is an integer. It will be appreciated that 1 to N node components can be referred to individually or collectively as node components 302. In the described example, a query can be employed with respect to a local collection of nodes (e.g., 302). Additionally, it will be understood that the notion of collection 204 can include nodes 302 that are located remotely (e.g., from a different machine/ location). In this scenario, the query mechanism(s) (e.g., navigation component 206) can facilitate identification of relevant nodes based upon query criteria.

Other aspects are directed to implementation queries using expression trees in lieu of using delegates. Essentially, there are two ways a user can perform a query. One is over actual collections (e.g., in memory collection) and the other is over remote collections. In the remote collection scenario, the query is not represented by delegates but rather can be represented by expression trees. Therefore, the system employs the whole query rather than executing the query in disparate steps.

Figure 4:
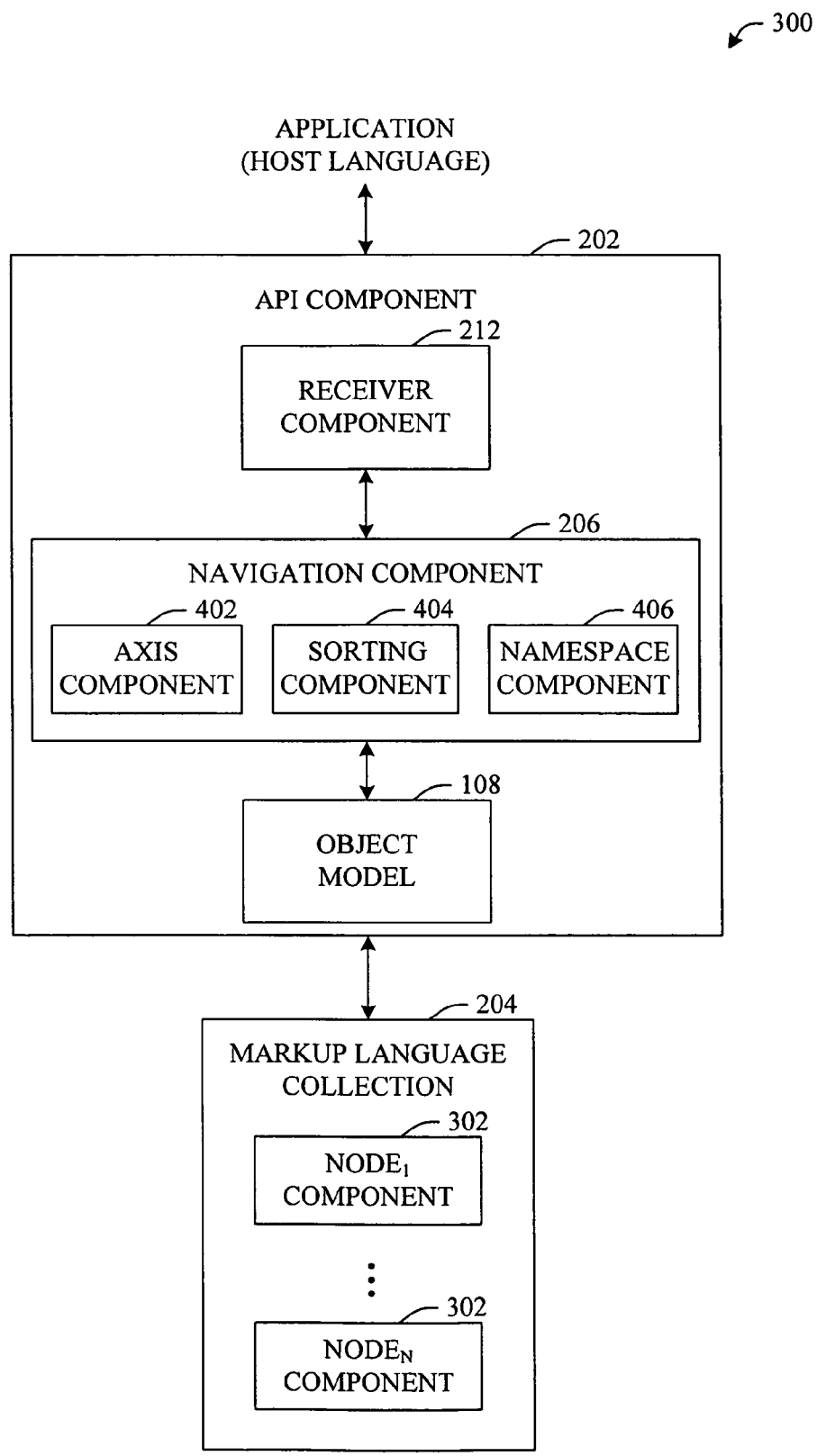
FIG. 4 illustrates a navigation component having an axis component, a sorting component and a namespace component in accordance with an aspect of the invention.

With reference now to FIG. 4, with respect to XML, a notion of axes in accordance with object model 108 is illustrated and represents a mechanism of the navigation component 206. More particularly, axis component 402 represents a mechanism to navigate from a given node 302 to other nodes 302 in an XML collection of nodes 204. It is to be understood that a collection 204 in an XML structure can be representative of a hierarchical tree constructed of interrelated nodes 302. Accordingly, the axis component 402 is a method that can facilitate navigating through the structure. By way of example, at a certain point in the structure the axis component 402 can enable identification of a parent of a given node, all of the children of a given node, etc. A mapping component (not shown) in conjunction with the object model 108 can facilitate such navigation and/or directional walking through the tree.

Given a node or collection of nodes (e.g., 302), a user may desire to traverse through the tree to identify the children, parents, etc., or the attributes. The API 202 contains several novel methods and/or mechanisms that correspond to the various axes (e.g., 402) for accessing attributes and elements.

For instance, these exemplary axis expressions can be represented by the corresponding axis functions. In the examples that follow, conventional XPath-brand expressions are listed in the left hand column. The corresponding axis expression in accordance with an aspect of the subject API 202 is listed in the right hand column.

| | |
|---|---|
| bib/book | ==> bib.Element[s] ("book") |
| bib/* | ==> bib.Elements( ) |
| book/@year | ==> book.Attribute("year") |
| bib//book | ==> bib/Descendants("book") |
| authors/ancestor::* | ==> authors.Ancestors( ) |

In general, the axis functions 402 can contain various levels of functionality. For example, an axis function can be employed with regard to a single item or on a source collection. As well, if desired, the axis component 402 can restrict the return values to nodes with a particular name. Accordingly, a user can restrict a search upon a collection. By way of further example, a user can query a collection for all of the child elements of a particular node or all of the child elements that share a certain name.

Moreover, the axis functions can be employed to restrict the return values of a particular type. This can be particularly useful when searching for values (e.g., only give values of type string or type integer).

As a result, the invention employs a number of overloads for each axis (e.g., Descendants and SelfAndDescendants). In order to provide context to the discussion, following is an exemplary list of all axes on the XElement class. It is to be appreciated that this list is not intended to be limiting in any way. As well, it will be appreciated that other axis functions exist with respect to other nodes in accordance with the invention and are to be included within the scope of this disclosure and claims appended hereto.

public XContainer Parent { }
    This function returns the parent of a node. This operates on XContainers where, as stated previously with respect to the exemplary object model 108, all XContainers have children.

public IEnumerable<object> Content( ) { }
    Given a node, a user can query for the parent of a node, and by employing this function to ask for its content, the system will render all of its children (e.g., content (e.g., values)). A novel feature of the invention is that, if there is some string content and some element content, this mixed content will be returned.

public IEnumerable<T> Content<T>( ) where T : class { }
    Above is an exemplary overload where a user can query for content of a certain type.

XElement Element(XName name) { }
    This axis returns elements with a particular name. In operation, it will return the first element with the specified name.
    The next five axes have a return type of IEnumerable.

IEnumerable<XElement> Elements ( ) { }
    This axis effects a rendering of all of the child elements directly contained within the specified element.

IEnumerable<XElement> Elements(XName name) { }
    Similarly, this axis renders only the elements of a certain name. As well, the following three axes are variations of the functionality described supra.

static IEnumerable<T> Elements<T>(this IEnumerable<XElement> source) where T : class { } static IEnumerable<XElement> Elements (this IEnumerable<XElement> source) { } static IEnumerable<XElement> Elements (this IEnumerable<XElement> source, XName name) { }

XAttribute Attribute(XName name) { }
    This axis returns an attribute with the specified name.
    Once again, as described above with respect to XElement, XAttribute can be overloaded onto collections as well. Below are exemplary aspects of overloading in accordance with the invention.

IEnumerable<XAttribute> Attributes( ) { }

IEnumerable<XAttribute> Attributes(XName name) { } static IEnumerable<XAttribute> Attributes (this IEnumerable<XElement> source) { } static IEnumerable<XAttribute> Attributes (this IEnumerable<XElement> source, XName name) { }

IEnumerable<XElement> Descendants( ){ }
    This function renders the children of children and the children of those children, etc. Effectively, this axis function recursively returns all of the children of a node.

IEnumerable<T> Descendants<T>( ) where T : class { }
    This can filter out descendents of a certain type.
    Other axes examples include the following.

IEnumerable<XElement> Descendants(XName name) { } static IEnumerable<T> Descendants<T>(this IEnumerable<XElement> source) where T : class { } static IEnumerable<XElement> Descendants (this IEnumerable<XElement> source) { } static IEnumerable<XElement> Descendants (this IEnumerable<XElement> source, XName name) { }

IEnumerable<XElement> SelfAndDescendants( ) { }

IEnumerable<T> SelfAndDescendants<T>( ) where T : class { }

IEnumerable<XElement> SelfAndDescendants(XName name) { } static IEnumerable<T> SelfAndDescendants<T>(this IEnumerable<XElement> source) where T : class { }

```
static IEnumerable<XElement> SelfAndDescendants(this
IEnumerable<XElement> source) { } static IEnumerable<XElement> SelfAndDescendants(this
IEnumerable<XElement> source, XName name) { }

IEnumerable<XElement> Ancestors( ) { }

IEnumerable<XElement> Ancestors(XName name) { } static    IEnumerable<XElement>    Ancestors    (this
IEnumerable<XElement> source) { } static    IEnumerable<XElement>    Ancestors    (this
IEnumerable<XElement> source, XName name) { }

IEnumerable<XElement> SelfAndAncestors( ) { }

IEnumerable<XElement> SelfAndAncestors(XName name)
{ } static    IEnumerable<XElement>    SelfAndAncestors(this
IEnumerable<XElement> source) { } static    IEnumerable<XElement>    SelfAndAncestors(this
IEnumerable<XElement> source, XName name) { }
```

As illustrated, above are exemplary axes in accordance with the invention. It is to be understood that these axes can be employed with respect to single collections and can return collections.

It is to be understood that the subject invention allows symmetry between Elements and Attributes. For example, as illustrated in the above signatures, elements and attributes are selected in the same way instead of using a method (e.g., Attributes("foo")) and an indexer ["bar"] (e.g., square brackets) as in the traditional APIs. However, in accordance with the API 202 described herein, a user can access both the element and/or attributes in the same manner. In other words, the only difference is that disparate axes are utilized while maintaining symmetry of the methods employed.

In operation, a user can query (e.g., via navigation component 206) for elements and, in turn, the system can return collections of elements. Subsequently, aspects enable a user to query for all of the attributes of the returned collection of elements. It is to be understood that this novel functionality allows a user to chain axes together with respect to a collections.

It will be appreciated that, upon querying XML, a query can return a collection (or subset of a collection) of nodes. Traditionally, the order of the rendered collection of nodes is maintained in document order. For example, if one node comes before another in a query result, one can interpret that the node comes before the subsequent resultant node in the document itself. This node will be encountered before the next. In other words, the order that nodes are returned as a result of a query are in the same order as the original document itself.

Some queries (e.g., descendant queries) can disturb document order. For instance, in an XQuery-brand environment, the semantics facilitate automatically sorting the results into document order following every query. As will be appreciated, sorting in document order is very expensive. Aspects of the subject API 202 do not automatically sort in document order therefore the queries can be matched up. Moreover, the navigation component 206 can include a sorting component 404 that facilitates explicitly sorting in document order as desired.

Rather than building this sorting functionality into the semantics, aspects facilitate certain queries to disturb document order thereafter enabling explicit sorting as desired. It is a novel feature of the invention that aspects do not maintain document order. Additionally, document order can be effected via explicit sorting (e.g., sorting component 404). It will be appreciated that numerous methods and mechanisms of encoding information into the nodes that facilitate efficient sorting in document order. These methods and mechanisms can be understood by those skilled in the art and are to be considered within the scope of this specification and claims appended hereto.

As stated earlier, the subject API 202 does not consider specific identity for text nodes and/or collections of attributes. Conventional systems such as the standard DOM exposes an XML infoset data model that identifies information items at a finer granularity than the data model exposed by the invention described in this specification. As a result, the data model of the subject invention can allow for a more efficient implementation, especially with respect to working set.

For example, aspects of the subject innovation employ ordinary strings rather than text nodes. Additionally, adjacent strings are automatically merged thereby increasing the efficiency. In other words, the invention does not expose a separate AttributeCollection as in the traditional DOM. Rather, in accordance with aspects of the invention, each element directly maintains a (cyclic) linked list of attributes.

Because conventional systems have a very detailed object model, they distinguish many different nodes. Additionally, every node has an individual namespace collection.

Additionally, in conventional systems, collections of attributes have identity. In other words, collection of attributes of a node has itself something that can be distinguished. They can also distinguish text nodes. Thus, in mixed content, the pieces of text are separate nodes themselves. To the contrary, in accordance with the subject invention, the pieces of text in mixed content are just normal strings. They are not special text nodes having specific identity and attached properties such as parent pointers and namespace nodes.

The subject invention employs a coarser view of the information set than traditional systems thereby distinguishing fewer properties of nodes. Unlike earlier systems that require distinguishing between nodes, the subject invention does not have to distinguish text nodes. Therefore, it will be understood that the subject system(s) can have a smaller memory footprint and a more efficient implementation than conventional systems.

All elements and attributes have names. Specifically, in XML, after the open bracket there is a name. Therefore, conventionally, if a user wants to search inside a document, the names for the elements and/or attributes would have to be prepared. For example, a user can query to obtain all of the authors for a particular document. This would return all of the author elements in the document. It will be understood that it is can be particularly inefficient and expensive to compare the element names or attribute names as strings. This is very costly because when comparing strings it is necessary to traverse through all of the string characters until a different character is located.

If the names are long, it can be particularly expensive because the difference might be at the end of the string. With this in mind, rather than storing the names as strings, the API 202 described herein can store the strings as type called XName. It will be understood that this is oftentimes referred to as string hashing. By employing this hashing technique to the API 202 described, pointers can be compared instead of strings. Thus, every time a new element name is created, the system can store (e.g., cache) the string and return the pointer to a new XName. Therefore if two names are represented by the same XName, they use the same pointer.

The problem is the table within the namespace component 406 can grow. Aspects of the invention can monitor growth (e.g., rate, size) and/or purge the name table based upon any defined criteria. The "ClearNameCache" functionality is shown in the example that follows. Therefore, when the system compares again, it will discover that the name no longer exists and will reinsert the name accordingly. This monitoring and purging functionality gives explicit control over the name table corresponding to the namespace 406. Additionally, the system can monitor growth and corresponding statistics thereby generating events when the table grows too quickly, etc.

A name in XML can consist of two parts, a local name which is like an element (e.g., book, author) and a namespace prefix. This two part naming convention is particularly useful because multiple elements can exist with a conflicting name in the same document. Therefore, aspects of the API 202 can put these names into a namespace 406 having a unique string by combining it with a prefix.

As such, the API 202 can represent these fully qualified or universal names by having the namespace prefix incorporated and the local name appended to it. Every name can be composed of the namespace URI and the local name.

The API 202 employs a novel system and/or methodology to apply XML names and namespaces. As described earlier, in one example, the XName class can represent universal or expanded names of the form "{http://www.cars.com/xml}part" that are composed from a local element or attribute name "part" and a namespace URI "http://www.cars.com/xml".

The XName class can allow for efficient comparison of XML names by entering strings and comparing object references. By providing an implicit conversion from strings to XNames, there is no need for users to construct XNames explicitly.

```
public sealed class XName
{
        public string ExpandedName { }
        public string LocalName { }
        public string NamespaceName { }
        public override int GetHashCode( ) { }
        public override bool Equals(object obj) { }
        public override string ToString( ) { }
        public static void ClearNameCache( ) { }
        public static XName Get (string expandedName) { }
        public static XName Get (string localName, string
namespaceName) { }
        public static implicit operator XName(string s) { }
        public static bool operator == (XName n1, XName n2) { }
        public static bool operator != (XName n1, XName n2) { }
    }
```

As shown above, the XName class enters these strings. Therefore these names are not compared as strings because they are compared via the XName references. Since the subject API 202 provides implicit operators from strings, it is not necessary for a user to create this XName explicitly.

Figure 5:
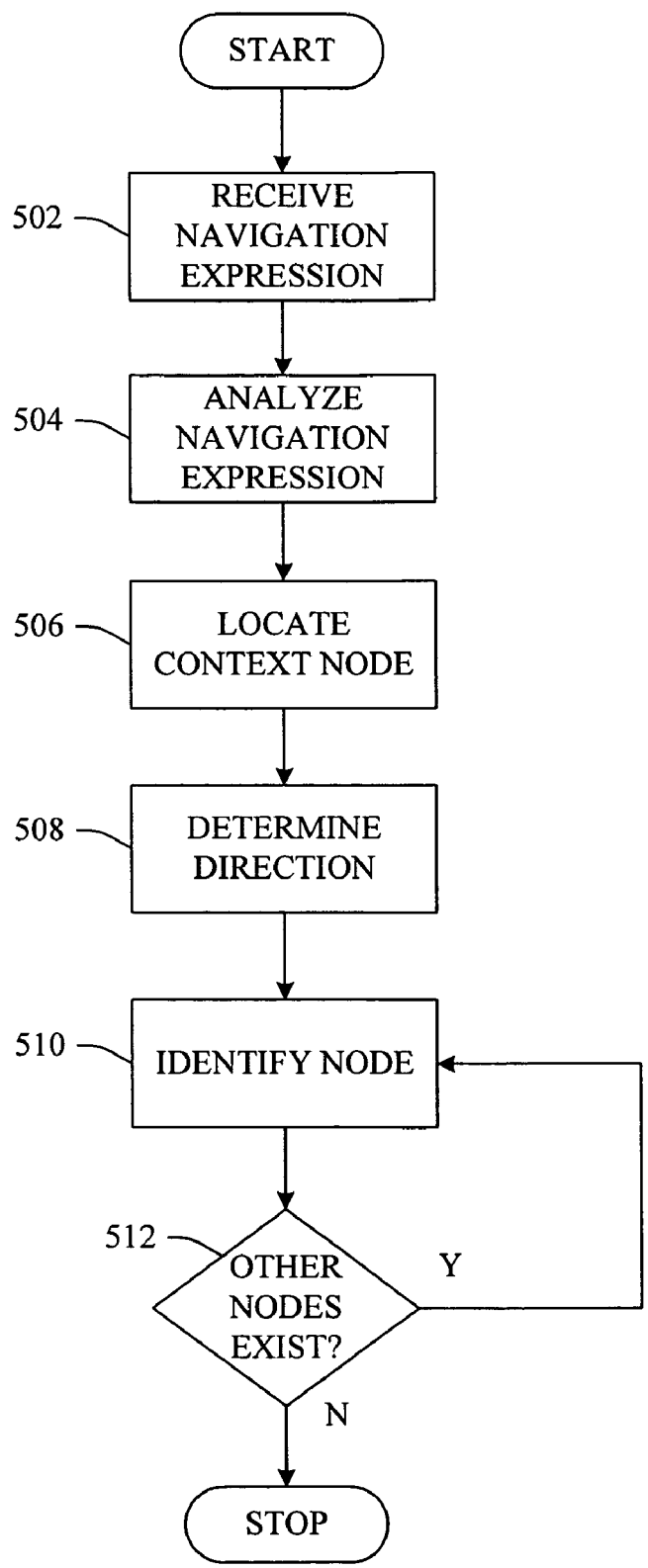
FIG. 5 illustrates an exemplary flow chart of procedures that facilitate navigating within a markup language component in accordance with an aspect of the invention.

FIG. 5 illustrates a process flow diagram of a methodology of navigating through a structure (e.g., collection) of markup language (e.g., XML) nodes in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 502, a navigation expression is received. As described supra, the navigation expression can be an axis statement that identifies a desired target(s) (e.g., value) within the collection. For example, the navigation expression can request the parents of a particular node.

The navigation expression (e.g., axis) can be analyzed at 504. In disparate examples, the navigation expression can request the parents, grandparents, siblings, etc. of a particular node. Accordingly, a context node can be identified at 506. This context node can define a starting point for the navigation expression. Further, a direction of navigation can be determined at 508.

A node that satisfies the navigation expression can be identified at 510. At 512, a determination can be made if additional nodes exist. If additional nodes exist in the structure (e.g., tree), the process can return to 510 thus identifying the additional node(s). If additional nodes do not exist, a stop block is reached.

Figure 6:
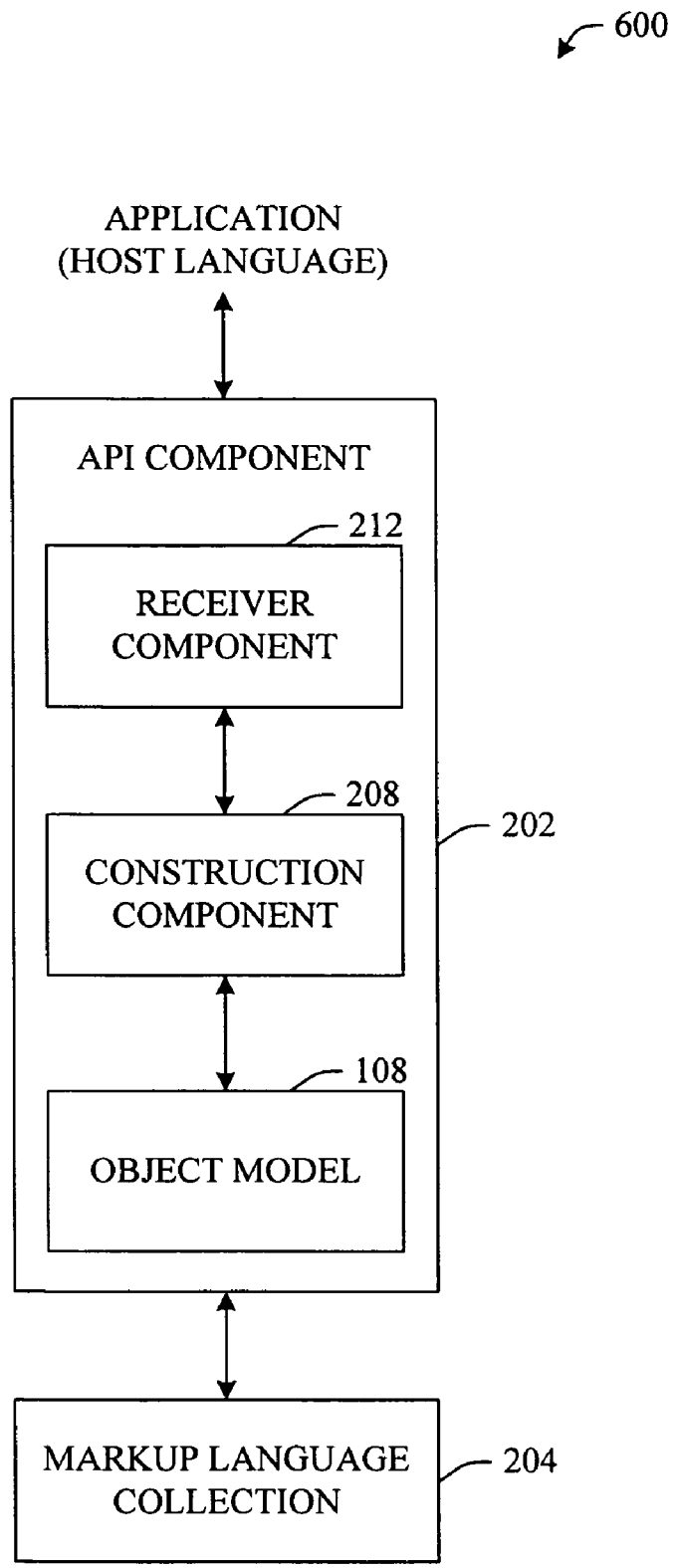
FIG. 6 illustrates a block diagram of an API system having a construction component and a receiver component in accordance with an aspect of the invention.

Referring now to FIG. 6, a system 600 in accordance with yet another aspect of the invention is shown. More particularly, FIG. 6 illustrates a system 600 that facilitates constructing XML context-free fragments, nodes or collections of nodes. Traditionally, XML APIs are imperative in structure. In other words, XML nodes are constructed via a structured and particular sequence of commands. By way of example, the imperative sequence of commands begins with defining a node and continue by adding one child, another child, etc.

The subject API component 202 can employ a receiving component 212 that accepts a command (e.g., expression). The construction component 208, together with the object model 108, can convert the expression into an XML fragment or collection 204.

Figure 7:
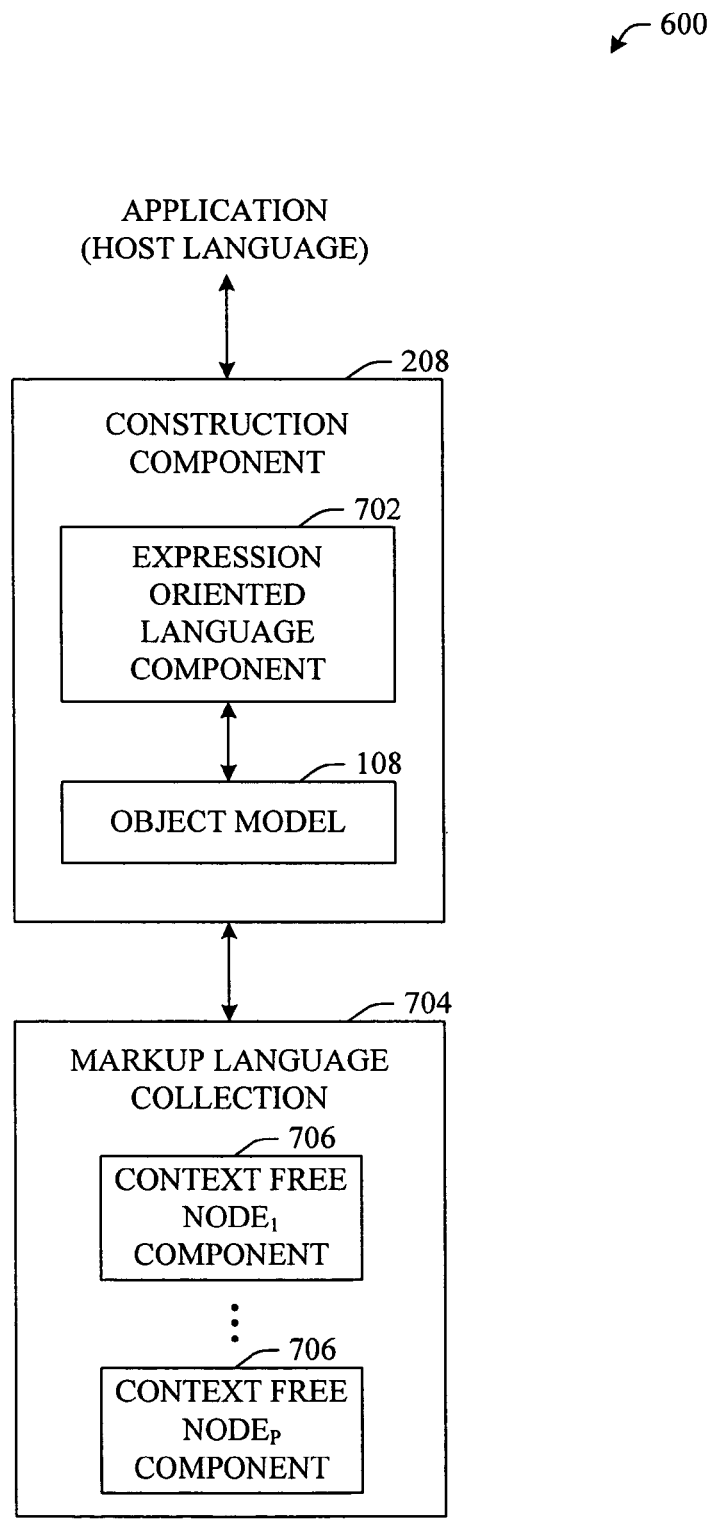
FIG. 7 illustrates a system that employs an expression oriented statement and constructs a context-free node in accordance with an aspect of the invention.

FIG. 7 illustrates an alternative block diagram of system 600. As shown, construction component 208 can receive an expression oriented language component 702. Accordingly, construction component 208 can be employed, in accordance with the object model component 108, to convert the expression oriented language component 702 into a markup language collection 704 of nodes. As shown, markup language collection 704 can include 1 to P context-free node components, where P is an integer. It is to be understood that 1 to P context-free node components can be referred to individually or collectively as context-free node components 706.

To facilitate working with queries, the subject invention employs an expression oriented mechanism (e.g., expression oriented language component 702) to construct XML nodes (e.g., construction component 208). Rather than employing imperative statements to generate XML collection(s), the subject invention utilizes the novel expression oriented method of creating the nodes. As will be appreciated, in conventional systems and methods, XML nodes are document centric. In other words, conventional XML nodes only live in the context of a document. These traditional nodes cannot live independently. In contrast thereto, the subject API 202 generates context free nodes which can live independently from a document.

A novel feature of the context-free node component 706 is that these context-free node components 706 can be created autonomously and used as children of other nodes. Thus, in contrast to conventional systems and in accordance with the subject API 202, context-free node components 706 do not have to live in the context of a document per se.

In operation, when a node is created it has no parents. The created node does not live as a child of any other node since it is newly created. A novel feature of the invention is that when a node is designated as a child of another node, or if there a query returns a node that is to be included as a child, the construction component 208 can automatically clone the node when it already has a parent. It is to be understood that these nodes can only have one parent. Therefore, if a different node is selected as a parent of a node, the node can be automatically cloned thereby permitting the parenthood. To the contrary, conventional APIs mandate users to explicitly clone nodes.

The construction component 208 of system 600 can automatically check to determine if a parent exists for a node. If so, the construction component 208 can automatically clone and designate the new parent, the parent of the clone. The result of this cloning is a novel context-free node construction.

When parented nodes are used to construct new nodes, they can be automatically cloned to maintain the structure of the newly constructed node. However, nodes do not have to be parented and, in particular, nodes can exist independent of a document. The example that follows is provided to add context to the invention and therefore, is not intended to limit the disclosure in any way.

```
class Test
{
    public static void Main( )
    {
        XElement a = new XElement("A");      <== a not parented
        XElement b1 = new XElement("B", a);  <== a does not get cloned
        XElement b2 = new XElement("B", a);  <== a does get cloned
        a.Add(new XElement("C"));            <== only b1 gets modified
        Console.WriteLine("---------------");
        Console.WriteLine(b1);
        Console.WriteLine("---------------");
        Console.WriteLine(b2);
        Console.WriteLine("---------------");
    }
}
```

The above example renders the following structure:

```
---------------
<B>
    <A>
        <C />
    </A>
</B>
---------------
<B>
    <A />
</B>
---------------
```

Following is a discussion of an XML fragment that can be ultimately created in accordance with an aspect of the API 202. As the previous example shows, XML fragments and documents are constructed in a functional or, expression-based manner instead of an imperative manner via a sequence of statements. For example, the following hierarchical XML element can be created utilizing the expression-oriented manner as illustrated below.

```
<bib>
    <books>
        <book year="1999">
            <title>TCP/IP Illustrated</title>
            <author>
                <last>Stevens</last>
                <first>W.</first>
            </author>
            <publisher>Addison-Wesley</publisher>
            <price>65.95</price>
        </book>
    </books>
</bib>
```

The above XML fragment can be created using this invention API 202 together with corresponding sub-components (e.g., construction component 208, object model 108). In operation, a single nested expression that is isomorphic to the structure of the resulting element can be written. For example:

```
XElement bib =
    new XElement ("bib",
        new XElement ("books",
            new XElement ("book",
                new XAttribute("year", "1999"),
                new XElement("title", "TCP/IP Illustrated"),
                new XElement ("author",
                    new XElement("last", "Stevens"),
                    new XElement("first", "W.")
                ),
                new XElement ("publisher", "Addison-Wesley"),
                new XElement("price", 65.95)
            )
        )
    );
```

Creating the above XML fragment using conventional APIs is overly cumbersome. Using existing APIs, such as conventional XML DOM, a user would first need to build a container document. Next, elements and attributes would have to be imperatively created in the context of that document. Additionally, a user would have to imperatively assign these nodes as children of other nodes. Below is an example of this process in accordance with a conventional API.

XmlDocument doc = new XmlDocument( );

XmlElement bib = doc.CreateElement("bib");

XmlElement book = doc.CreateElement( );

books.Name = "books";

bib.appendChild(books);

XmlElement book = doc.CreateElement("book");

books.appendChild(book);

XmlAttribute year = doc.CreateAttribute( );

year.Value="1999"

book.SetAttributeNode(year);

XmlElement title = doc.CreateElement("title");

title.InnerText = "TCP/IP Illustrated";

book.appendChild(title);

XmlElement author = doc.CreateElement("author");

book.appendChild(author);

XmlElement lastName = doc.CreateElement("last");

lastName.InnerText = "Steven";

author.appendChild(lastName);

XmlElement firstName = doc.CreateElement("first");

firstName.InnerText = "W.";

author.appendChild(firstName);

XmlElement publisher = doc.CreateElement("publisher");

publisher.InnerText = "Addison-Wesley";

book.appendChild(publisher);

XmlElement price = doc.CreateElement("price");

price.InnerText = "65.95";

book.appendChild(price);

doc.DocumentElement.InsertBefore(bib, doc.DocumentElement.LastChild);

It will be appreciated that this conventional method cannot be used in a query because when a user wants to return a new XML fragment as a result of a query, it is not always in the context of a particular document. On the other hand, the ability to create context-free structures (as described in accordance with the subject API 202) facilitates direct querying of the XML fragment. Aspects of the API 202 for querying rely on the fact that a user can create originals as expressions.

Figure 8:
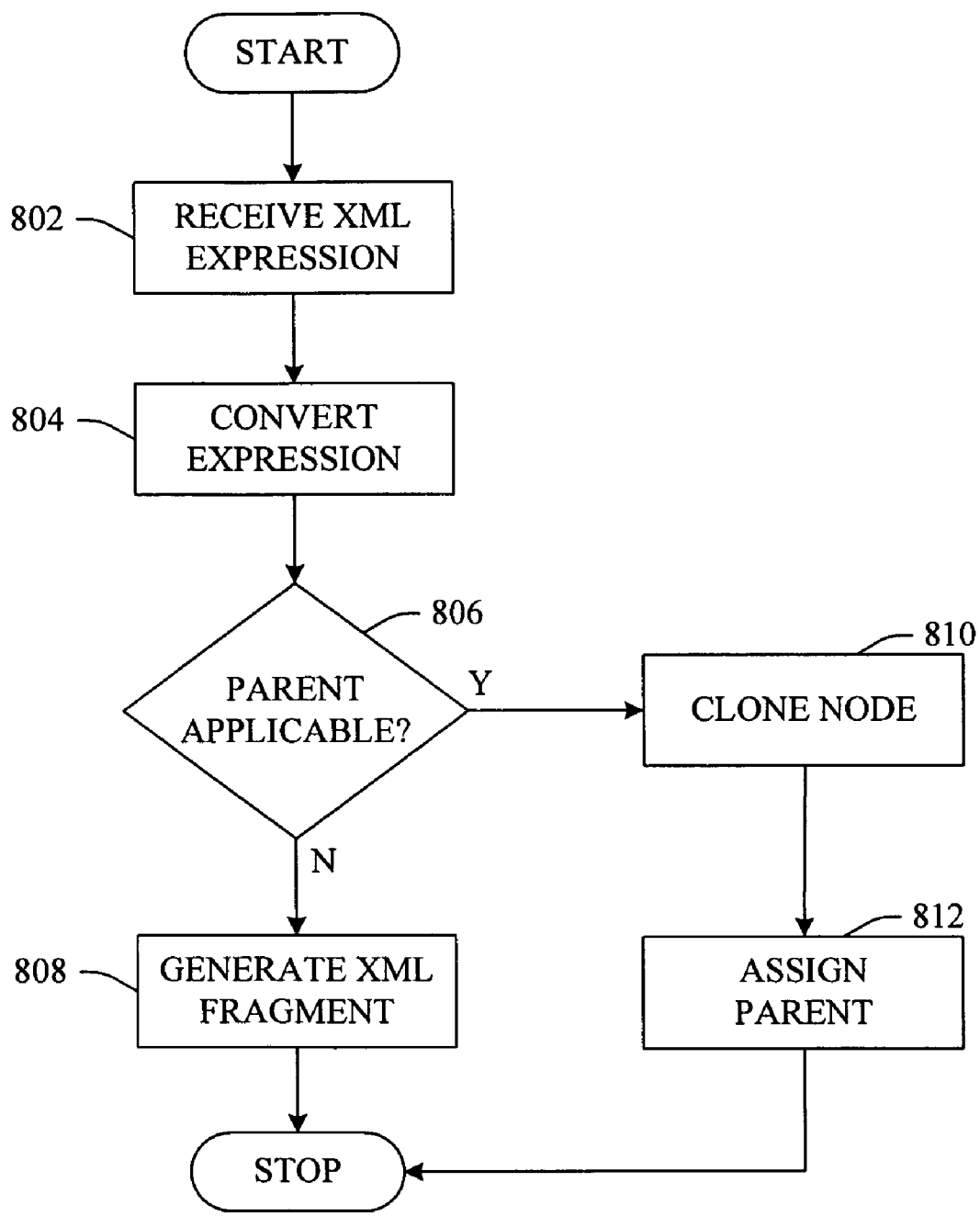
FIG. 8 illustrates an exemplary flow chart of procedures that facilitate constructing context-free (e.g., node centric) nodes in accordance with an aspect.

FIG. 8 illustrates a methodology of converting an expression oriented statement into an XML fragment. At 802, an expression oriented statement is received. For example, a receiving component can be employed to accept an expression oriented statement from a construction component. The received statement can be converted at 804. As described with reference to FIG. 7, a construction component can be employed to convert the statement. At 806, a determination can be made if the node created is to be parented. If not, an XML fragment can be generated from the converted expression at 808.

If at 806 it is determined that if the node to be created is to be parented, the node can be cloned at 810. Accordingly, the parent can be assigned at 812. It is to be appreciated that the methodology of FIG. 8 can be employed for each node created.

Figure 9:
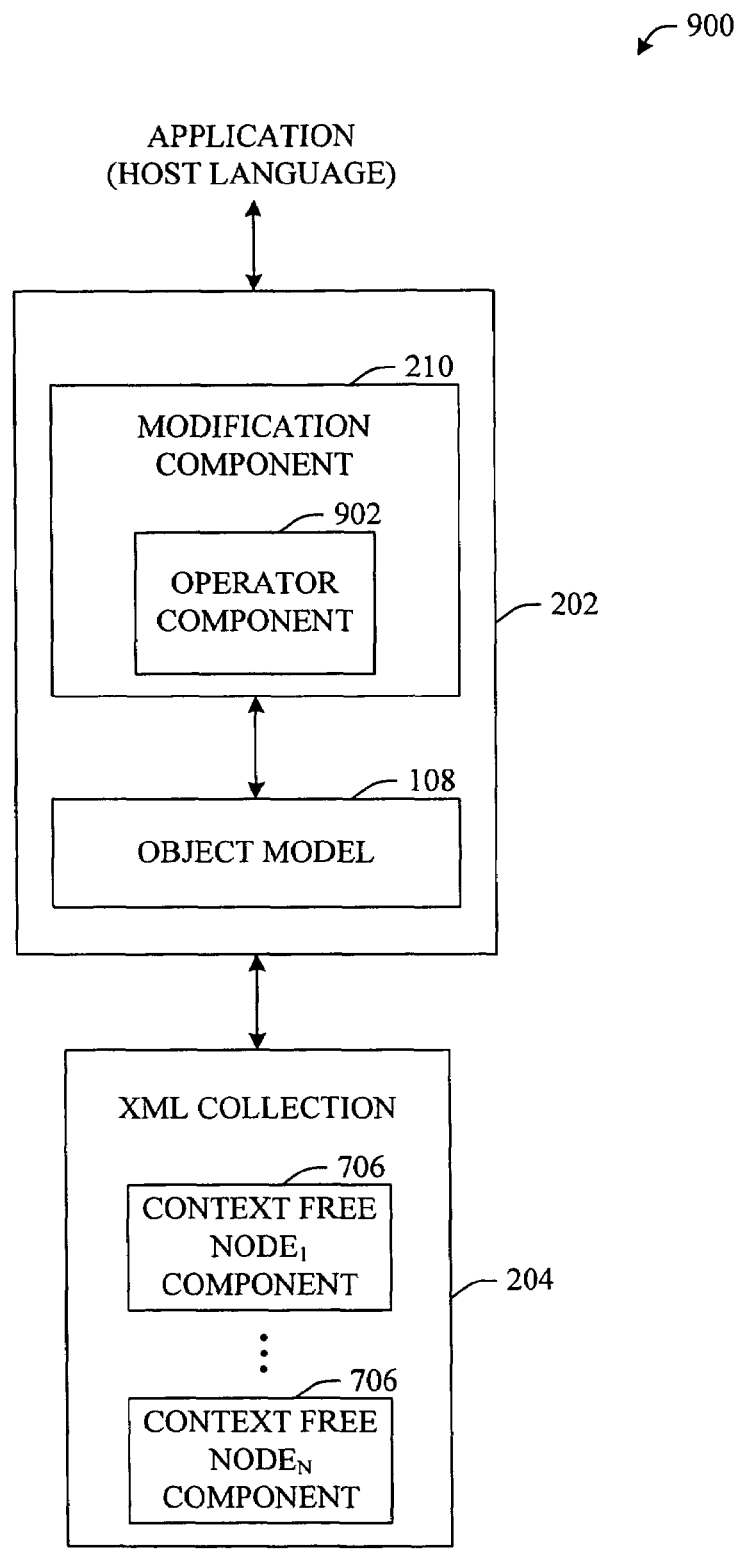
FIG. 9 illustrates a block diagram of an API system having a modification component and an operator component in accordance with an aspect of the invention.

Referring now to FIG. 9, a system 900 that facilitates modifying a node in accordance with an aspect of the invention is shown. Generally, system 900 can include an API component 202 that facilitates interfacing with a markup language collection 204. It is to be appreciated that the markup language collection 204 can include a plurality of XML nodes having context-free and/or document centric nodes.

The API component 202 can include a modification component 210 having an operator component 902. The operator component 902 can facilitate manipulating a node itself, its parents, its children, etc. Following is an exemplary list of statements that update (e.g., manipulate) parents of a node. As well, examples of updating the current node itself are included thereafter.

Updates on parent:

void AddAfterThis(object content) { }

This statement adds a new sibling to a node. More particularly, the statement facilitates, in the parent node, after the node, adding the specified node.

Other examples are as follows:

void AddAfterThis(params object[ ] content) { } void AddBeforeThis(object content) { } void AddBeforeThis(params object[ ] content) { } void Remove( ) { }—you can remove yourself from the parent container

Updates on self:

void Add (object content) { }—This statement adds at the end.

void Add (params object[ ] content) { }—This statement adds at the end.

void AddFirst (object content) { }—This statement adds at the beginning.

void AddFirst (params object[ ] content) { }—This statement adds at the beginning.

void RemoveContent( ) { } void ReplaceContent(object content) { } void ReplaceContent(params object[ ] content) { } void RemoveAll( ) { } void RemoveAttributes( ) { } void SetAttribute(XName name, object value) { } void SetElement(XName name, object.value) { }

In addition to the functionality of the construction component 208, the modification component 210, in conjunction with the operator component 902 allows a user to perform in-place updates. In other words, the modification component 210 enables imperative modifications to the document in addition to functional construction.

Figure 10:
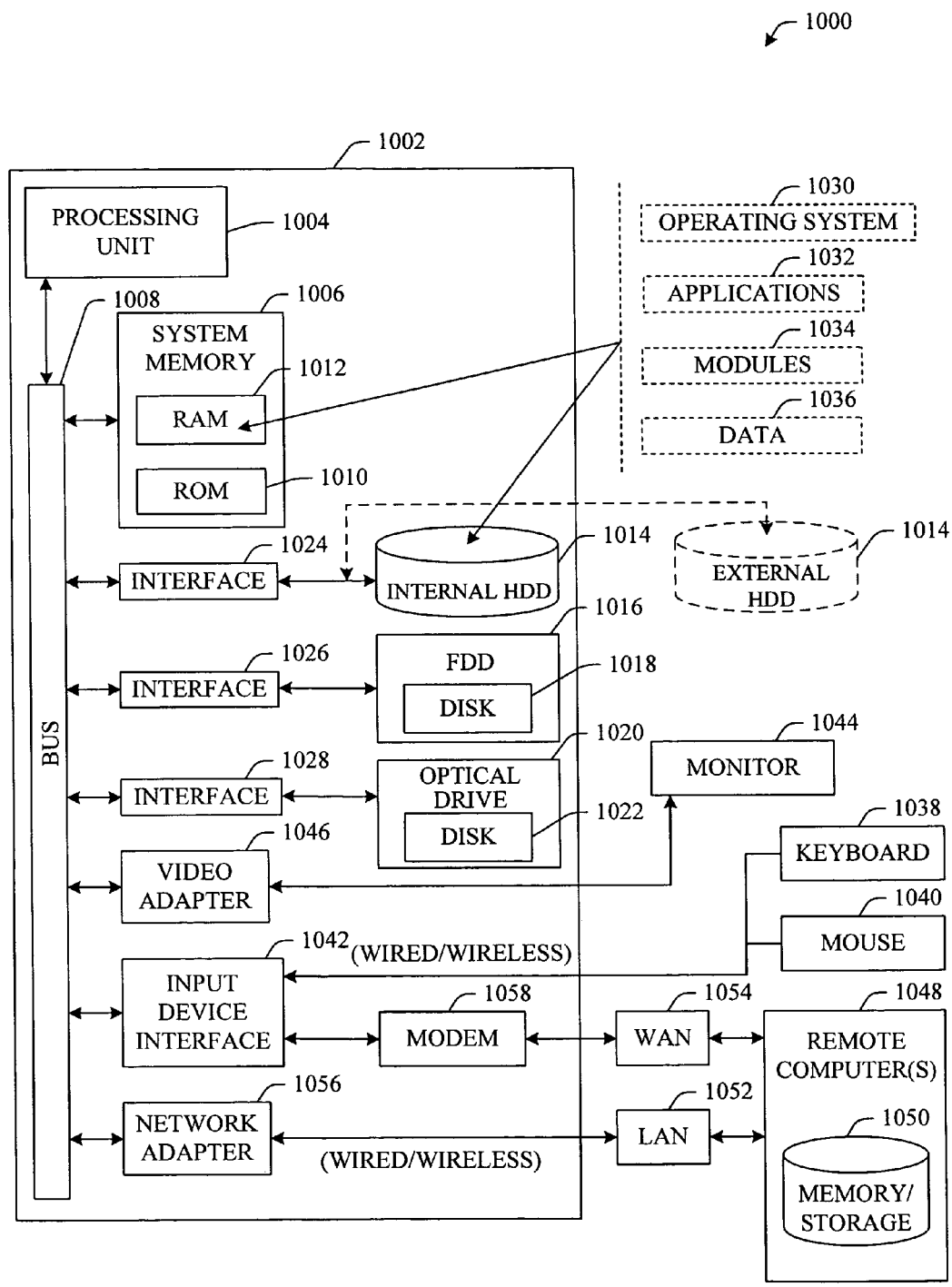
FIG. 10 illustrates a block diagram of a computer operable to execute the disclosed architecture.

Referring now to FIG. 10, there is illustrated a block diagram of a computer operable to interface an application to a markup language component (e.g., XML). In order to provide additional context for various aspects of the subject invention, FIG. 10 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 11:
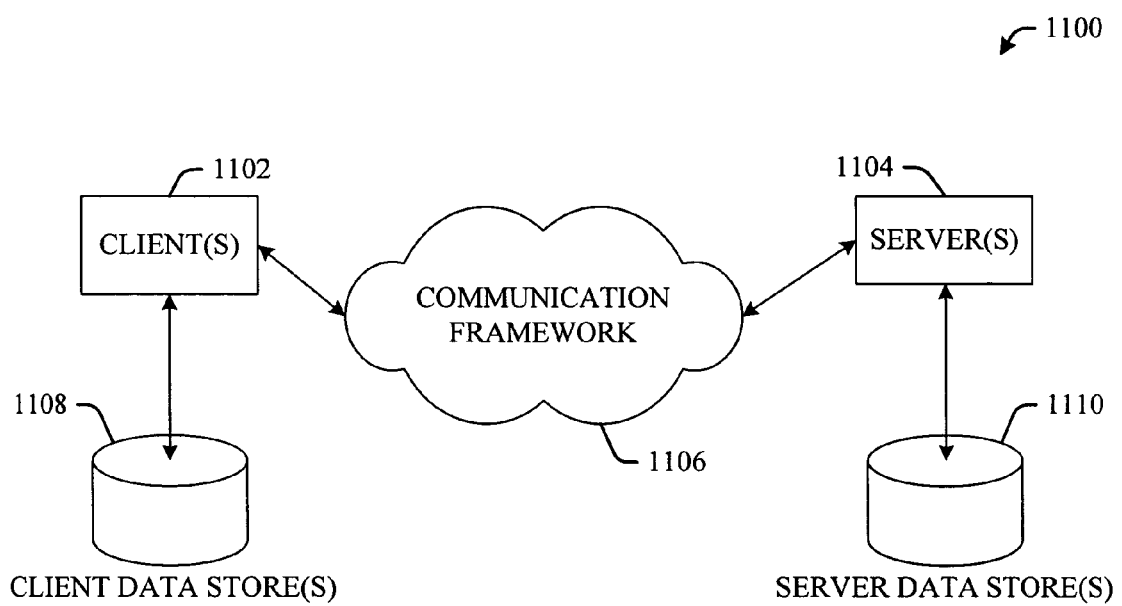
FIG. 11 illustrates a schematic block diagram of an exemplary computing environment in accordance with the subject invention.

Referring now to FIG. 11, there is illustrated a schematic block diagram of an exemplary computing environment 1100 in accordance an aspect of the subject API. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An application program interface (API) system that facilitates interaction with extensible markup language (XML) data, comprising:

a memory that stores data related to the interaction;

an object model component that distinguishes between a plurality of XML node types, the object model component utilizes a simplified non-event-stream based DOM approach;

a receiver component that interfaces with an application and receives data in an expression-oriented format consistent with the object model, the expression oriented format selects elements and attributes in the same manner; and an action component that facilitates construction, query and modification of the XML data employing the received data, wherein the action component includes a construction component that generates at least an XML fragment independent of a document context based at least in part upon the received data that employs a single nested expression isomorphic to a structure of the generated XML fragment.

2. The system of claim 1, the plurality of XML node types includes at least one of, a type XName that represents one or more universal names composed of a namespace uniform resource identifier (URI) and a local name, a type XAttribute that represents one or more attributes, a type XNode that represents an abstract base class for one or more XML child node types, a type XComment that represents one or more XML comments, a type XProcessingInstruction that represents one or more XML processing instructions, a XDeclaration that represents one or more XML declarations, a type XDocumentType that represents an XML document type declaration, an abstract type XCharacterNode that represents a base class for character data, an abstract type XCData, that represents one or more XML CData sections, an abstract type XContainer that represents one or more nodes that have children, a type XElement, the type XContainer represents one or more XML elements, and a type XDocument, that represents a complete XML document.

3. The system of claim 1, the action component exposes an axis that includes at least one of a Parent, Element, Attribute, Descendant, SelfAndDecendant, Ancestor and SelfAndAncestor.

4. The system of claim 3, further comprising a sorting component that explicitly sorts a query resultant data set by a document order.

5. The system of claim 3, the axis works on one of a single item and a source collection, the axis facilitates restriction of a return value to nodes with at least one of a particular name and a particular type.

6. The system of claim 1, the action component includes a modification component that facilitates alteration of the XML data based at least in part upon the data received in the expression-oriented format.

7. The system of claim 6, the modification component includes an operator component that identifies an action with respect to a node.

8. The system of claim 7, the action is at least one of
an update on a parent relative to a receiver node, the update on the parent includes at least one of adding an item in the parent, adding a collection of items in the parent and removing the receiver node from a receiver node parent, and
an update on at least one of the receiver node and a collection of receiver nodes, the update on the at least one of the receiver node and the collection of receiver nodes includes at least one of adding an item to the receiver node, adding a collection of children to the receiver node, removing children of the receiver node, replacing the children of the receiver node with a single item, replacing the children of the receiver node with a collection of items, adding an attribute, removing an attribute, replacing content of a specified child node and replacing an attribute of the receiving node.

9. A method of interfacing an application with XML data, comprising:
establishing an object model that distinguishes between a plurality of XML node types, the object model utilizes a simplified non-event-stream based DOM approach;
receiving an expression oriented statement consistent with the object model, the expression oriented statement selects elements and attributes in the same manner; and
constructing, querying and modifying the XML data based at least in part upon the received expression oriented statement, wherein the XML data includes at least one node-centric XML fragment that is independent of a document context and is generated by employing the received expression oriented statement having a single nested expression isomorphic to a structure of the XML fragment to be constructed.

10. The method of claim 9, the act of construction of the XML data, includes creating the at least one XML fragment.

11. The method of claim 9, the plurality of XML node types includes at least one of,
a type XName that represents one or more universal names composed of a namespace uniform resource identifier (URI) and a local name,
a type XAttribute that represents one or more attributes,
a type XNode that represents an abstract base class for one or more XML child node types,
a type XComment that represents one or more XML comments,
a type XProcessingInstruction that represents one or more XML processing instructions,
a XDeclaration that represents one or more XML declarations,
a type XDocumentType that represents an XML document type declaration,
an abstract type XCharacterNode that represents a base class for character data,
an abstract type XCData, that represents one or more XML CData sections,
an abstract type XContainer that represents one or more nodes that have children,
a type XElement, the type XContainer represents one or more XML elements, and
a type XDocument, that represents a complete XML document.

12. The method of claim 9, further comprising exposing an axis that includes at least one of a Parent, Element, Attribute, Descendant, SelfAndDecendant, Ancestor and SelfAndAncestor.

13. The method of claim 9, further comprising explicitly sorting a query resultant data set by a document order.

14. A computer readable medium having computer executable instructions stored thereon for carrying out the method of claim 9.

15. A system that facilitates interaction between an application and XML data, comprising:
means for storing data related to the interaction;
means for identifying an object model, the object model distinguishes between a plurality of XML node types, the object model utilizes a simplified non-event-stream based DOM approach;
means for employing an expression oriented statement based at least in part upon the object model to facilitate an action upon the markup language component, the expression oriented statement selects elements and attributes in the same manner; the action includes constructing the XML data comprising one or more node-centric XML fragments which are independent of a container document and are generated by employing the received expression oriented statement having a single nested expression isomorphic to a structure of the XML fragment to be constructed;
means for querying the XML data by employing the expression oriented statement; and
means for modifying the XML data by employing the expression oriented statement.

16. The system of claim 15, the plurality of XML node types includes at least one of,
a type XName that represents one or more universal names composed of a namespace uniform resource identifier (URI) and a local name,
a type XAttribute that represents one or more attributes,
a type XNode that represents an abstract base class for one or more XML child node types,
a type XComment that represents one or more XML comments,
a type XProcessingInstruction that represents one or more XML processing instructions,
a XDeclaration that represents one or more XML declarations,
a type XDocumentType that represents an XML document type declaration,
an abstract type XCharacterNode that represents a base class for character data,
an abstract type XCData, that represents one or more XML CData sections,
an abstract type XContainer that represents one or more nodes that have children,
a type XElement, the type XContainer represents one or more XML elements, and
a type XDocument, that represents a complete XML document.

* * * * *